June 23, 1936.
T. BARISH
2,045,174
BEARING
Filed May 3, 1934
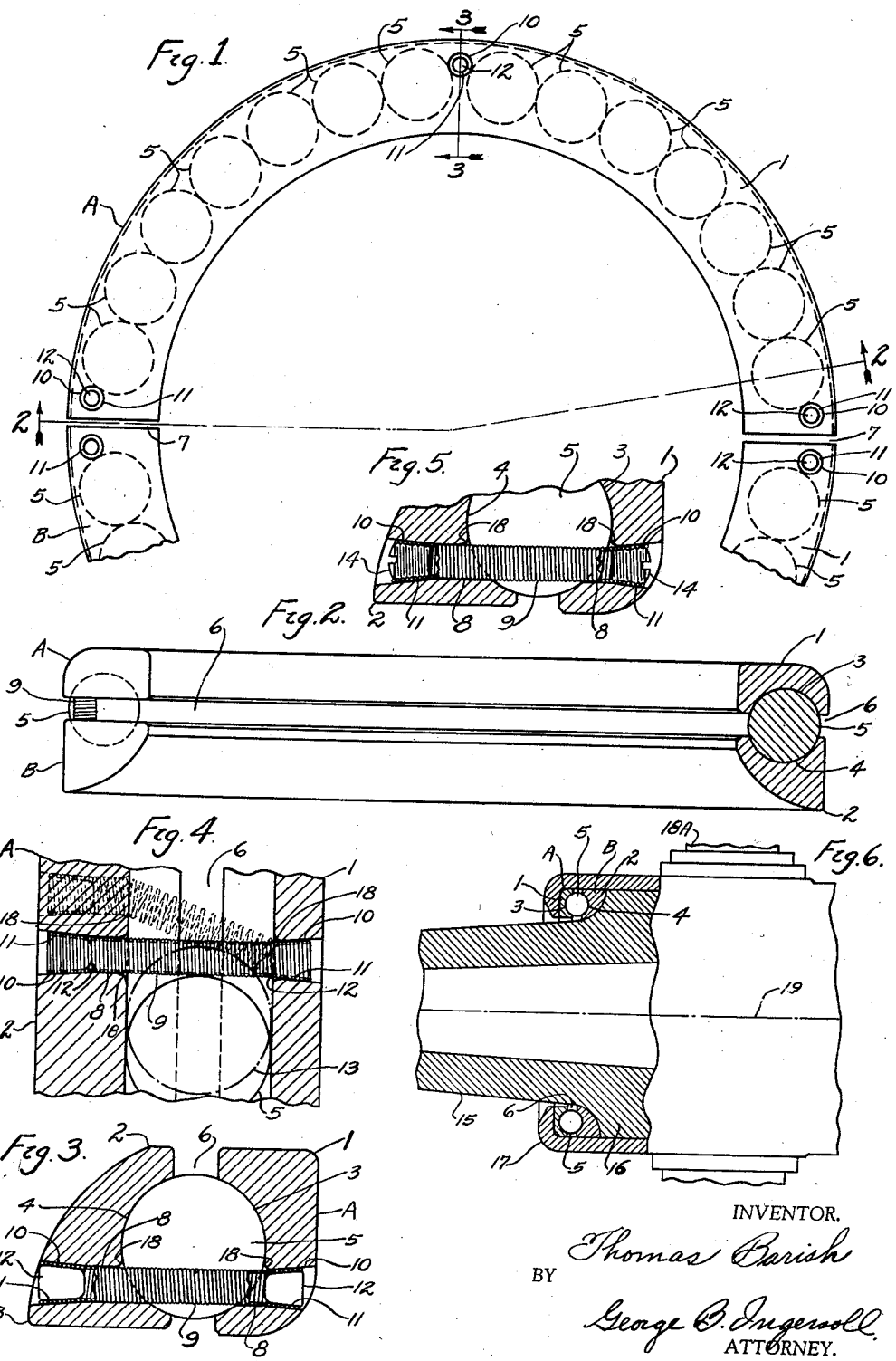
INVENTOR.
Thomas Barish
BY
George B. Ingersoll
ATTORNEY.

Patented June 23, 1936

2,045,174

UNITED STATES PATENT OFFICE 2,045,174

BEARING

Thomas Barish, Jamestown, N. Y., assignor, by mesne assignments, to Marlin-Rockwell Corporation, Jamestown, N. Y., a corporation of Delaware Application May 3, 1934, Serial No. 723,623

19 Claims. (Cl. 308—196)

My invention relates to improvements in bearings provided with race members having antifriction members rollably mounted therebetween; and the objects of my improvements are, first, to provide a bearing, of the popularly designated "split" type, having segmental assemblies associated to form the complete bearing; second, to provide a bearing, having segmental race members and rollably mounted members therebetween, with means for holding the segmental portions together during handling, transporting, and assembly operations; third, to provide a bearing, having segmental race members and rollably mounted members therebetween, with means for returning the segmental and rollably mounted members to their normal positions in the event that they become displaced during assembly, etc.; fourth, to provide a bearing, having segmental race members and rollably mounted members therebetween, with means for retaining the rollably mounted members in their operative positions between the segmental race members; fifth, to provide a bearing, having race members and rollably mounted members therebetween, with resilient or flexible means for holding the race and rollably mounted members together in their operative positions; sixth, to provide a bearing, having race members and rollably mounted members therebetween, with means for retaining the race and rollably mounted members in their operative positions, said means being expanded, after assembly in the race members, to its retaining position; and seventh, to provide a bearing, having races and rollably mounted members therebetween, with retainer members for holding the race and rollably mounted members in their operative positions, said retainer means being expanded by tapered members to assume their holding positions relative to the race members.

I attain these objects by the mechanism illustrated in the accompanying drawing, in which—

Figure 1 is a side view of the bearing assembly; Figure 2, a sectional view of the bearing assembly taken on the line 2—2, Figure 1; Figure 3, a sectional view of the bearing taken on the line 3—3, Figure 1; Figure 4, a partial sectional view of the race members together with one of the rollably mounted members therebetween, said view disclosing the normal or initial position of one of the retaining springs, said view further disclosing the position of the retaining spring after one of the race members and the rollably mounted member have been actuated to the end of their substantial maximum movement relative to the other race member; Figure 5, a sectional view of the bearing assembly disclosing a modified construction of means for expanding the retaining member relative to the race members; and Figure 6, a view disclosing an installation of the bearing assembly in a propeller mechanism.

Similar numerals refer to similar parts throughout the several views.

The complete bearing assembly comprises the segmental assemblies A and B, thus providing a complete bearing assembly of the type popularly known and designated as the "split" type, which enables the bearing assembly to be installed around units relative to which it would be impossible to assemble the usual type of bearing assembly which is assembled longitudinally over the unit which it is to support and the thrust loads of which are to be absorbed by the bearing assembly.

The segmental assemblies A and B are each provided with the race members 1 and 2, the segmental race assembly 1 being provided with the raceway or surface 3, the segmental race member 2 being provided with the raceway or surface 4, the races 3 and 4 being adapted to be rollably engaged by the balls or rollably mounted members 5, a plurality of which are arranged radially around the axis of the bearing assemblies to permit movement of one of the race members relative to the other of the race members as more fully disclosed hereinafter.

The segmental bearing assemblies A and B, when assembled as disclosed in the installation shown in Figure 6 and in similar installations, will provide the clearance or operating spaces 7 which thus provide the "split" feature of the bearing assembly.

In order to hold the race members 1 and 2 in their proper positions during handling, transporting, assembly, and similar operations, the race members 1 and 2 are each provided with the holes or recesses 8 in which are assembled the resilient or retaining members 9 which are constructed of closely wound resilient coils in the form of a hollow spring, popularly known as the "garter" type. The holes 8 in the race members 1 and 2 are provided adjacent the outer surfaces of the race members 1 and 2 with the tapered, conical, or enlarged ends 10, the tapered ends 10 permitting the outer ends 11 of the retainer member 9 to be expanded or spread to a size larger than the normal size of the central body of the retainer member 9 to permit the expanded ends 11 to be maintained closely in contact with the inner surfaces of the tapered ends 10 of the holes 8 in the race members 1 and 2 to securely anchor the retainer members 9.

In order to expand the enlarged ends 11, the tapered or wedge member 12 is forced into the open ends of the retainer member 9 to expand and hold the expanded ends 11 in close contact with the surfaces 10. It will thus be noted that the retainer members 9 are thus retained longitudinally relative to the race members 1 and 2 and will form retaining means for always retaining the race members 1 and 2 and in their normal or initial central positions, and to return the race members 1 and 2 to said normal or initial central positions in case one of the race members is displaced during assembly or in operation.

The retainer members 9 may be located, as disclosed in Figure 1, adjacent the clearance spaces or "split" 7 to keep the balls 5 away from the clearance space or "split" 7. A suitable number of the retainer members may be used in each of the segmental assemblies A and B, Figure 5 disclosing three of said retainer members in each of the segmental assemblies A and B, one of the retainer members being located between a pair of balls 5 and substantially in a midway position between the "split" of the segmental assemblies.

Figure 4 discloses the operating position of one of the retainer members 9 when the race member 2, for example, has been actuated in operation to substantially a movement of 10° relative to the race member 1, in which operating position the ball member 5 will have moved to the position as indicated by the dotted lines 13.

It is to be noted in this connection that the ball 5 in travelling from its position as indicated by the full lines in Figure 4 to the position as indicated by the dotted lines 13, will have travelled substantially one-half as much as the race member 2 relative to the race member 1, the ball member 5 being always in contact with the retainer member 9, the point where the retainer member 9 contacts with the ball member 4 always moving substantially one-half as much as the race member 2, thus avoiding any serious stress at the contact point between the retainer member 9 and the ball member 5. In this operation it will be further noted that the coils of the retainer member 9, at its central portion, will have become separated as disclosed in Figure 4, thus elongating and tending to increase the over-all length of the retainer member 9 to permit the race member 2 to move relative to the race member 1. The longitudinal centers of the retainer members 9 will be located between the outside diameter of the bearing assemblies and the axes of the ball members 5. The race members 1 and 2 may be provided with the proper contour on their outer surfaces to accommodate contact with the unit which the bearing assembly is supporting and also with the housing in which the bearing assembly is mounted.

It is also to be noted that whereas I have disclosed a tapered or wedge member 12 in Figure 3 for expanding the ends 11 of the retainer member 9, I disclose in Figure 5 a modified means by which the expanded ends 11 of the retainer member 9 may be expanded or spread by means of the tapered threaded plugs or screws 14 as desired.

It is to be noted that my invention will permit considerable economy of manufacture in the design and construction of such units as the variable pitch propeller, which is indicated at 15 in Figure 6, and in which construction the propeller is occasionally made at the inner end thereof with a blunt or swaged end 16, the outer or blade end of the propeller 15 being conventionally provided with enlarged blade portions which thus, together with the blunt or swaged ends 16, do not permit a conventional bearing assembly without the "split" therein to be assembled over the propeller 15 after it has been fully constructed.

Some installations of a bearing assembly with conventionally constructed propellers, such as indicated at 15, require expensive and unusual alloy steel requirements being incorporated in the bearing assembly to permit the swaging operation of the end 16 with the bearing already in position around the propeller 15. Also in some instances expensive and complicated nut mechanisms are used to replace the swaged end 16.

It will thus be noted that my invention will permit of the positioning of the bearing assembly in the housing 17, which supports the propeller 15 and is disclosed as substantially indicating the hub of a propeller mechanism suitably mounted on a crank or driving shaft 18A, the housing 17 being suitably provided with a "split" on its center line 19 to permit the housing 17 being assembled around the bearing assembly after it has been assembled over the propeller 15, my bearing assembly thus permitting the propeller 15 to be constructed with its enlarged ends 16, which construction is thus facilitated by the ability of my bearing assembly to have its segmental bearing assemblies A and B to be placed around the propeller 15 irrespective of its construction, and which may be of a larger diameter than the inside diameter of the bearing assembly.

It is to be noted that my invention provides a bearing assembly construction which facilitates its assembly relative to supported units having enlarged ends and is especially applicable where the unit or shaft rotates through a substantially small movement such as indicated in Figure 4.

The inner edges of the holes 8 will be suitably rounded or chamfered, as at 18, to prevent chafing or injuring the resilient members 9 when displaced to permit movement of one of the race members relative to the other of the race members, as disclosed in Figure 4.

I claim:

1. In a bearing, the combination of a pair of segmental race members provided with raceways oppositely disposed and extending longitudinally in a radial path relative to the axis of the bearing, a plurality of holes extending through said segmental race members in planes located substantially parallel with the axis of the bearing assembly, said holes being located between the longitudinal center of said raceways and the outermost surface of the bearing, each of said holes in said segmental race members being provided with an enlarged tapered portion at their outer ends, a plurality of rollably mounted members engaging the raceways of said segmental race members, resilient members mounted in said holes of said segmental race members and engaging one or more of said rollably mounted members, said resilient members permitting movement of one of said segmental race members together with said rollably mounted members from their normal positions relative to the other of said segmental race members, said resilient members causing said segmental race member and said rollably mounted members to return to their normal positions relative to the other of said segmental race members, and wedge members for expanding the ends of said resilient members to engage the enlarged tapered portions of said holes of said segmental race members to retain said resilient members in said segmental race members.

2. In a bearing, the combination of a pair of race members provided with holes extending therethrough, rollably mounted members between said race members, resilient means in said holes for engaging and retaining said rollably mounted members between said race members, and means for retaining said resilient means in said holes of said race members.

3. In a bearing, the combination of a pair of race members provided with holes extending therethrough, rollably mounted members between said race members, resilient means in said holes for retaining said rollably mounted members between said pair of race members, and wedge members for expanding the outer portions of said resilient members to retain said resilient members in said holes of said race members.

4. In a bearing, the combination of race members, ball members operatively mounted between said race members, and hollow resilient members suitably mounted in said race members for retaining said ball members between said race members, and tapered members suitably mounted in the ends of said hollow resilient members to expand said ends to enlarged sections to retain said hollow resilient members in said race members.

5. In a bearing, the combination of a pair of race members, rollably mounted members between said pair of race members, members for retaining said rollably mounted members between said pair of race members, each of said last mentioned members having resilient coils, and means for securing a portion of the resilient coils of said last mentioned members against longitudinal movement to anchor said last mentioned members relative to said pair of race members, the remainder of the resilient coils of said last mentioned members being adapted to move longitudinally to permit one of said pair of race members and said rollably mounted members to move about the axis of the bearing and relative to the other of said pair of race members.

6. In a bearing, a plurality of bearing assemblies having split portions therebetween to facilitate assembly, said plurality of bearing assemblies forming the complete bearing, each of said bearing assemblies having rollably mounted members suitably mounted together with a plurality of resilient means suitably mounted and located between said rollably mounted members and the split portions of the bearing assemblies, each of said plurality of resilient means engaging and retaining said rollably mounted members in said bearing assemblies, each of said plurality of resilient means having axes located in different planes.

7. In a bearing, the combination of a pair of race members, rollably mounted members between said pair of race members, and a plurality of means suitably mounted in and extending between said pair of race members, said means retaining said rollably mounted members between said pair of race members, said means being adapted to permit rotation of one of said race members through a partial revolution only relative to the other of said race members, each of said means being normally located with their axes extending parallel with the axis of the bearing, each of the axes of the said plurality of means having their axes further located in different planes from each other and from the axis of the bearing.

8. In a bearing, the combination of a pair of segmental race members, a plurality of rollably mounted members between said pair of segmental race members, and a plurality of resilient members suitably mounted in and extending between said pair of segmental race members, said resilient members retaining said plurality of rollably mounted members, one of said plurality of resilient members being located between each of the ends of said segmental race members and one of said plurality of rollably mounted members, one of said resilient members engaging one only of said rollably mounted members, one of said plurality of resilient members being located substantially midway between the ends of said segmental race members, said last mentioned one of said resilient members being further located between and in engagement solely with a pair of said rollably mounted members.

9. In a bearing, the combination of a pair of race members each provided with holes extending therein, said holes being located radially relative to the axes of the bearing, rollably mounted members between said pair of race members, coiled springs in each of said holes and extending between said pair of race members and adjacent the sides of a portion only of said rollably mounted members, and means for retaining said coiled springs in said holes of said pair of race members.

10. In a bearing, the combination of a pair of concentric members provided with grooved raceways, a plurality of rollably mounted members between said pair of concentric members and engaging said grooved raceways, and resilient members attached to and extending between said pair of concentric members, said resilient members constituting the sole means for maintaining said rollably mounted members in their operative positions longitudinally of said grooved raceways, said resilient members permitting said rollably mounted members and one of said concentric members to be axially displaced circumferentially around the axis of said pair of concentric members, said resilient members contacting two or more of said rollably mounted members, the position of said resilient members extending between said concentric members, said resilient members being located solely in the path of said rollably mounted members.

11. In a bearing, the combination of a pair of segmental members located concentrically relative to one another each provided with grooved raceways, a plurality of rollably mounted members between said pair of segmental members and engaging said grooved raceways, and resilient members attached to and extending between said pair of segmental members at points located between the ends of said pair of segmental members and one of said rollably mounted members, said resilient members constituting the sole means for maintaining said rollably mounted members in their operative positions around said grooved raceways of said segmental members, said resilient members permitting said rollably mounted members to be axially displaced circumferentially around the axis of said pair of segmental members, said resilient members contacting said rollably mounted members located adjacent the ends only of said segmental members, the portions of said resilient members extending between said pair of segmental members being located solely in the path of said rollably mounted members.

12. In a bearing, the combination of a pair of race members each provided with grooved raceways, a plurality of groups of rollably mounted members mounted in said grooved raceways, each of the rollably mounted members of each of said groups engaging one another, and members retaining said pair of race members and said rollably mounted members together, said members positioning said rollably mounted members in said grooved raceways, said members extending transversely through said grooved raceways, said members permitting one of said race members and said rollably mounted members to move from an initial position about the axis of the bearing and relative to the other of said race members, said members causing said one of said race members and said rollably mounted members to return to their initial positions relative to the other of said race members.

13. In a bearing, the combination of a pair of race members each having grooved raceways on its inner side, ball members engaging said grooved raceways and spacing said race members, and resilient members connected between and tending to move said race members against said ball members, said resilient members locating said ball members longitudinally of said grooved raceways of said race members.

14. In a bearing, the combination of a pair of race members of substantially equal diameter, ball members spacing said race members, means for holding said race members in contact with said ball members to form a unit bearing, said means locating said ball members axially between said race members, and retaining means mounted within said first mentioned means, said retaining means locking said first mentioned means in its operative position for holding said race members.

15. In a bearing, the combination of a pair of race members of substantially equal diameter and provided with bores together with grooved raceways on their inner sides, one of said race members having a radius at its outside peripheral edge, the other of said race members having a radius at its inside edge adjacent said bore, the radius at said inside edge adjacent said bore being greater than the radius at said outside peripheral edge, rollable members engaging said grooved raceways of said race members, and resilient members mounted in and extending between said race members to engage two or more of said rollable members to position said rollable members, said resilient members maintaining said rollable and said race members together as a unit, said resilient members being located between the longitudinal centers of said grooved raceways and the outside circumferences of said race members.

16. In a bearing, the combination of a pair of race members each provided with grooved raceways extending therearound, rollable members engaging said grooved raceways of said pair of race members, and resilient members anchored in said race members and extending through said grooved raceways to engage two or more of said rollable members to position said rollable members and to hold said race members and said rollable members together as a unit.

17. In a bearing, the combination of a pair of members each provided with raceways, a group of ball members movably mounted between said pair of race members, said ball members engaging said raceways, and resilient members having their ends anchored in said pair of members provided with raceways and extending substantially parallel with the axis of the bearing, said resilient means constituting the sole means for positioning said ball members around said raceways, said resilient members engaging the end ball members only of said group.

18. In a bearing, the combination of a pair of rigid race members having grooved raceways extending therearound, rollably mounted members engaging the grooved raceways of said pair of rigid race members and adapted to be displaced axially along said pair of grooved raceways, and means for positioning said rollably mounted members along said grooved raceways, said means being adapted to permit rotation of one of said pair of race members relative to the other, said means being located in the path of said rollably mounted members, said means having end portions anchored in said rigid race members and extending in planes extending substantially parallel with the axis of the bearing.

19. In a bearing for a housing provided with a bore, the combination of a pair of rigid race members mounted in the bore of said housing and each provided with a grooved raceway, rollably mounted members between said pair of rigid raceways and engaging said grooved raceways, and resilient means mounted in said rigid race members and positioning said rollably mounted members around said grooved raceways, said resilient members each extending through a space located in the path of said rollably mounted members, said space being located between one of said rollably mounted members and the surface of the bore of said housing, said space being of sufficient minimum area to prevent said resilient member extending therethrough from being moved by said rollably mounted members out of the path of said rollably mounted members, said resilient members each having an end anchored in one of said rigid race members and extending in a plane extending substantially parallel with the axis of the bearing.

THOMAS BARISH.